(12) United States Patent
Baeza et al.

(10) Patent No.: US 7,895,199 B2
(45) Date of Patent: Feb. 22, 2011

(54) METHOD AND SYSTEM FOR MODIFYING ORDERS

(75) Inventors: Richard Baeza, Irvine, CA (US); Alan Kwan, Montebello, CA (US); Cheryl Lamb, Long Beach, CA (US); Andrea Whobrey, Torrance, CA (US); Neil Vining, Ostrander, OH (US); Ted Kondo, Marysville, OH (US); Robert E. Feucht, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 11/109,434

(22) Filed: Apr. 19, 2005

(65) Prior Publication Data

US 2005/0246335 A1 Nov. 3, 2005

Related U.S. Application Data

(60) Provisional application No. 60/563,798, filed on Apr. 20, 2004, provisional application No. 60/579,136, filed on Jun. 12, 2004.

(51) Int. Cl.
*G06F 7/00* (2006.01)

(52) U.S. Cl. ........................ 707/731; 707/752

(58) Field of Classification Search ........................ None
See application file for complete search history.

(56) References Cited

U.S. PATENT DOCUMENTS

| | | | |
|---|---|---|---|
| 4,799,156 A | 1/1989 | Shavit et al. | |
| 5,237,496 A | 8/1993 | Kagami et al. | |
| 6,539,386 B1* | 3/2003 | Athavale et al. | 707/10 |
| 6,609,108 B1 | 8/2003 | Pulliam et al. | |
| 6,615,092 B2 | 9/2003 | Bickley et al. | |
| 2002/0010658 A1 | 1/2002 | Suzuki et al. | |
| 2002/0013753 A1* | 1/2002 | Marks de Chabris et al. | 705/36 |
| 2002/0019785 A1 | 2/2002 | Whitman | |
| 2002/0035533 A1 | 3/2002 | Mache | |
| 2002/0082956 A1 | 6/2002 | Peterson et al. | |
| 2002/0087576 A1 | 7/2002 | Geiger et al. | |
| 2002/0099631 A1 | 7/2002 | Vanker et al. | |
| 2002/0138373 A1 | 9/2002 | Reading | |
| 2002/0143669 A1 | 10/2002 | Scheer | |
| 2002/0156692 A1 | 10/2002 | Squeglia et al. | |
| 2002/0165722 A1* | 11/2002 | Luddy | 705/1 |
| 2002/0169675 A1 | 11/2002 | Helot et al. | |
| 2002/0180617 A1 | 12/2002 | Doyle | |
| 2003/0084039 A1* | 5/2003 | Balogh | 707/3 |
| 2003/0105766 A1 | 6/2003 | Chen et al. | |
| 2003/0130863 A1* | 7/2003 | Grey et al. | 705/1 |
| 2003/0135428 A1* | 7/2003 | Smith | 705/27 |
| 2003/0158769 A1 | 8/2003 | Uno et al. | |

(Continued)

*Primary Examiner*—Neveen Abel-Jalil
*Assistant Examiner*—Kellye D Buckingham
(74) *Attorney, Agent, or Firm*—McDermott Will & Emery LLP

(57) ABSTRACT

A system for modifying an order without requiring changes in the manufacturing processes associated with that order, or while minimizing such changes, may include a storage system having a database. The system may include a processor configured to load the database with orders that dealers want to modify, and to search the database to find one or more matches between the orders that dealers want to modify. The processor may be further configured to direct that the recipients of the matched orders be switched.

43 Claims, 3 Drawing Sheets

U.S. PATENT DOCUMENTS

| | | |
|---|---|---|
| 2003/0191657 A1* | 10/2003 | McQuilkin et al. ............. 705/1 |
| 2003/0212610 A1 | 11/2003 | Duffy et al. |
| 2003/0220845 A1* | 11/2003 | Chu et al. ..................... 705/26 |
| 2004/0034591 A1* | 2/2004 | Waelbroeck et al. .......... 705/37 |
| 2004/0044609 A1* | 3/2004 | Moore ......................... 705/37 |
| 2004/0098278 A1 | 5/2004 | Foth et al. |
| 2004/0117266 A1 | 6/2004 | Yen et al. |
| 2005/0197915 A1* | 9/2005 | Biwer et al. .................. 705/26 |
| 2005/0234790 A1* | 10/2005 | Newport ...................... 705/35 |
| 2010/0250447 A1* | 9/2010 | Hughes et al. ................ 705/80 |

* cited by examiner

METHOD AND SYSTEM FOR MODIFYING ORDERS

CROSS-REFERENCE TO RELATED APPLICATIONS

This application claims priority to U.S. provisional application, Ser. No. 60/563,798, filed on Apr. 20, 2004, entitled "Value Chain Fulfillment System and Method," and U.S. provisional application, Ser. No. 60/579,136, filed on Jun. 12, 2004, entitled "Modifying Orders For Specially-Configured Products (Value Chain)." The entire content of both applications is incorporated herein by reference.

BACKGROUND

Certain products may be ordered in various configurations. Examples may include, but are not limited to, automobiles and personal computers. Retailers of these products may often place orders for a large number of these types of products, specifying the configurations that they expect will sell best. Before an order is filled, however, a retailer may want to change an order for various reasons. One example may be when an automobile dealer learns that a particular color is not selling well after the order is placed. Another example may be when a customer wants a configuration that is not among those that have been ordered.

Manufacturers, on the other hand, may be unable to make last minute order changes. One reason, for example, may be that the manufacturers do not happen to have the needed parts on hand. Although manufacturers might be able to increase their stock of parts to anticipate last minute changes, this may add undesirable costs to the manufacturing process.

SUMMARY

A process for modifying an order that does not require a change in the manufacturing processes associated with that order may include loading a database with orders that waiting dealers want to modify, and receiving an order that a querying dealer wants to modify. The process may further include finding a match in the database between the order that the querying dealer wants to modify and an order that one of the waiting dealers wants to modify, and directing that the recipients of the matched orders be switched.

A process for modifying a plurality of orders that does not require a change in the manufacturing processes associated with those orders may include loading a database with orders that dealers want to modify, and finding a plurality of matches in the database between orders that the dealers want to modify. The process may further include directing that the recipients of the matched orders be switched.

A process for modifying a plurality of orders while minimizing changes in the manufacturing processes that are associated with those orders may include loading a database with orders that dealers want to modify, and searching the database for one or more matches between the orders that the dealers want to modify, using a first algorithm. The process may further include finding one or more matches in the database between still, unmatched orders that the dealers want to modify, following use of the first algorithm, and using a second algorithm that is different from the first algorithm. The process may further include directing that the recipients of the matched orders be switched.

A process for modifying a plurality of orders while minimizing changes in the manufacturing processes that are associated with those orders may include loading a database with orders that dealers want to modify, and finding one or more matches in the database between the orders that the dealers want to modify, using an algorithm that allows one or more manufacturing process changes to be made as part of the matching process. The process may further include directing that the recipients of the matched orders be switched.

A system for modifying an order without requiring a change in the manufacturing processes associated with that order may include a storage system containing a database. The system may further include a processor configured to load the database with orders that waiting dealers want to modify, and to receive an order that a querying dealer wants to modify. The processor may be further configured to search the database to find a match between the order that the querying dealer wants to modify and an order that one of the waiting dealers wants to modify. The processor may be further configured to direct the recipients of the matched orders to be switched, when the match is found.

A system for modifying a plurality of orders without requiring a change in the manufacturing processes associated with those orders may include a storage system having a database, and a processor configured to load the database with orders that dealers want to modify. The processor may be further configured to search the database to find a plurality of matches in the database between orders that the dealers want to modify, and to direct the recipients of the matched orders be switched.

A system for modifying a plurality of orders while minimizing changes in the manufacturing processes that are associated with those orders may include a storage system having a database, and a processor configured to load the database with orders that dealers want to modify. The processor may be configured to search the database for one or more matches between the orders that the dealers want to modify, using a first algorithm. The processor may be further configured to search the database, following use of the first algorithm, to find one or more matches in the database between still, unmatched orders that the dealers want to modify, using a second algorithm that is different from the first algorithm. The processor may be further configured to direct the recipients of the matched orders to be switched.

A system for modifying a plurality of orders while minimizing changes in the manufacturing processes that are associated with those orders may include a storage system including a database, and a processor configured to load the database with orders that dealers want to modify. The processor may be further configured to search the database in order to find one or more matches in the database between the orders that the dealers want to modify, using an algorithm that allows one or more manufacturing process changes to be made as part of the matching process. The processor may be further configured to direct that the recipients of the matched orders be switched.

A computer-readable medium may have stored therein computer-readable instructions for a processor, wherein the instructions, when read and implemented by the processor, cause the processor to load a database with orders that waiting dealers want to modify, and to receive an order that a querying dealer wants to modify. The instructions may further cause the processor to find a match in the database between the order that the querying dealer wants to modify and an order that one of the waiting dealers wants to modify, and to direct that the recipients of the matched orders be switched.

A computer-readable medium may have stored therein computer-readable instructions for a processor, wherein the instructions, when read and implemented by the processor, cause the processor to load a database with orders that dealers want to modify, and to find a plurality of matches in the database between orders that the dealers want to modify. The instructions may further cause the processor to direct that the recipients of the matched orders be switched.

A computer-readable medium may have stored therein computer-readable instructions for a processor, wherein the instructions, when read and implemented by the processor, cause the processor to load a database with orders that dealers want to modify, and to search the database for one or more matches between the orders that the dealers want to modify, using a first algorithm. The instructions may further cause the processor to find, following use of the first algorithm, one or more matches in the database between still, unmatched orders that the dealers want to modify, using a second algorithm that is different from the first algorithm. The instructions may further cause the processor to direct that the recipients of the matched orders be switched.

A computer-readable medium may have stored therein computer-readable instructions for a processor, wherein the instructions, when read and implemented by the processor, cause the processor to load a database with orders that dealers want to modify, and to find one or more matches in the database between the orders that the dealers want to modify using an algorithm that allows one or more manufacturing process changes to be made as part of the matching process. The instructions may further cause the processor to direct that the recipients of the matched orders be switched.

It should be understood that other embodiments of a method and system for modifying orders will become readily apparent to those skilled in the art from the following detailed description, in which various embodiments of the method and system for modifying orders are shown and described by way of illustration. As will be realized, other and different embodiments of the method and system for modifying orders are possible, and the details used to describe these embodiments are capable of modification in many respects. Accordingly, the drawings and the detailed description are to be regarded as illustrative in nature, and not as restrictive.

DETAILED DESCRIPTION

A method and system are described that allow dealers (including but not limited to automobile dealers) to change some or all of their orders after they are placed, with little or no disruption to the manufacturing process. In this way, the method and system may improve the velocity and flexibility with which the dealer and the customer receive the desired product, at the desired place, at the desired time. As used in this application, the term "dealer" means any merchant or retailer who sells any type of goods.

Figure 1:
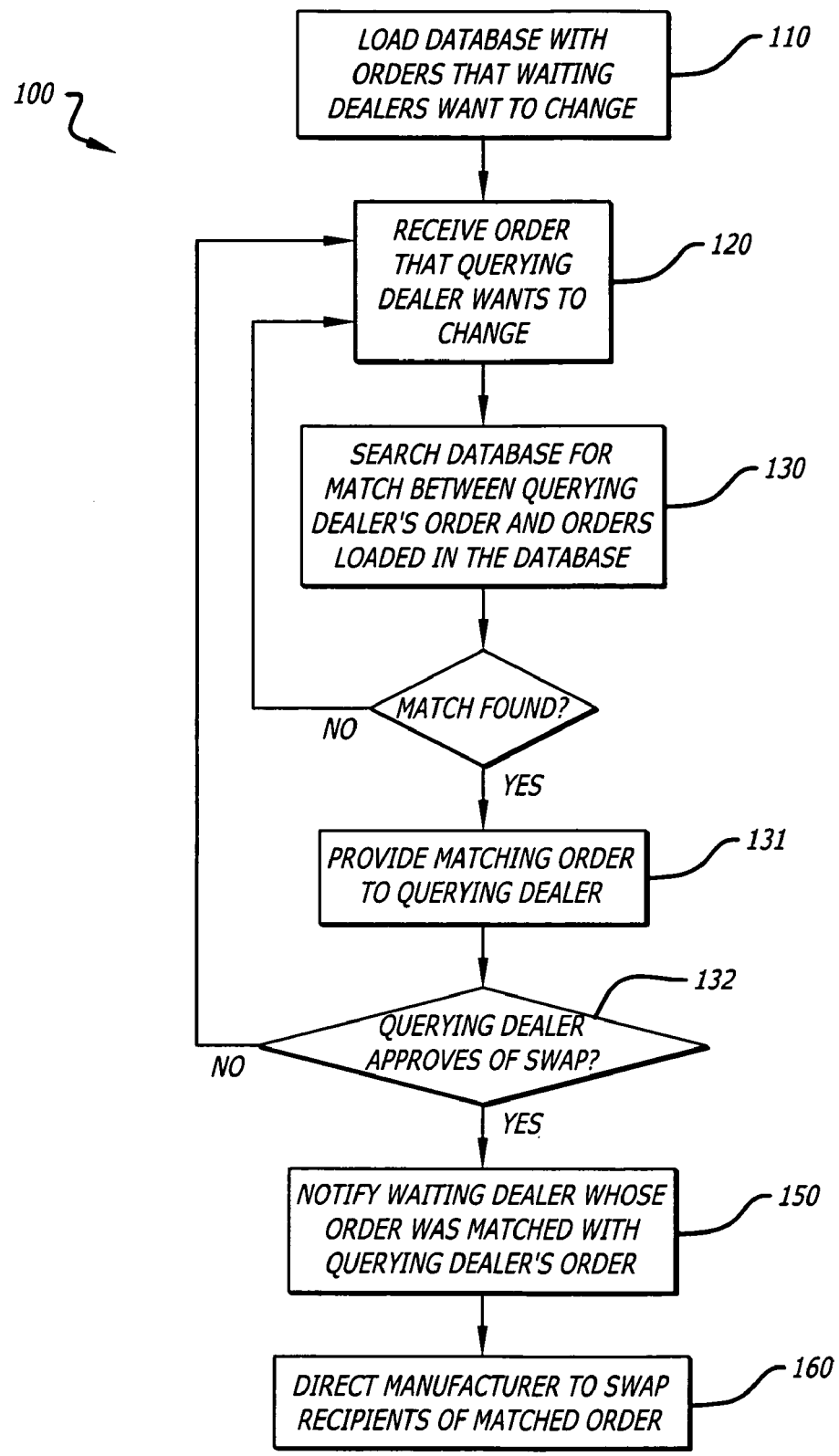
FIG. 1 is a flow chart that schematically illustrates an embodiment of a process for modifying an order that does not require a change in the manufacturing processes associated with that order.

FIG.1 is a flow chart that schematically illustrates a process 100 for modifying an order that does not require a change in the manufacturing processes associated with that order. In overview, in step 110, a plurality of orders that waiting dealers want to change may be loaded in a database. Dealers who want to change their order may submit an order change request, after which the dealers may wait for a matching order to be found for the submitted order change request. In step 120, a querying dealer may query the database with an order that the querying dealer wants to change, and the querying dealer's order change request may be received by a processing system connected to the database. In step 130, the processing system may search the database in order to find a match in the database between the order that the querying dealer wants to change, and one or more orders that the waiting dealers want to change, and that have been loaded in the database. In step 160, the processing system may direct that the recipients of matched orders, if any, be switched.

There may be a variety of reasons why a dealer may want to change an order, in steps 110 or 120. For example, a dealer may receive customers' requests for one or more product configurations that are not in stock in his inventory. As another example, the dealer may learn, after already placing orders, that one or more specific product configurations that the dealer has in stock, are not selling as well as predicted.

In step 110, an order change request submitted by a waiting dealer may include a description of the vehicle that the waiting dealer had originally ordered, and a description of the vehicle that the waiting dealer wants instead. The descriptions of the originally ordered item and the desired replacement item may be stored in the database, when the waiting dealer's order is loaded in the database.

In step 120, a querying dealer wanting to change an order may query this database, and provide the processing system with information describing the item that he had ordered and the modified item that he wants instead. The processing system may then search the database, in step 130, to see whether there are any waiting dealers who ordered the item that the querying dealer is seeking, and who want to exchange their order for the item that the querying dealer had originally ordered. The processing system may seek to identify, from the orders loaded in the database, the order for which the item originally ordered by one of the waiting dealers most closely matches the modified item wanted by the querying dealer, and for which the replacement item desired by the waiting dealer most closely matches the item that was ordered by the querying dealer.

As a result of searching the database, the processing system may find, in step 130, one match, or several matches, for the querying dealer's order change request. Alternatively, no matches may be found in the database by the processing system. If no match is found, the processing system may allow the querying dealer to submit a new order, and then repeat step 130 again for the new order.

If a match is found in the database for the querying dealer, the processing system may provide the matching order to the querying dealer, in step 131. In step 132, the processing system may seek confirmation from the querying dealer that the querying dealer agrees to a switch of the recipients of the matching orders.

If a plurality of matches are found in step 130, a list of each available, matching item may be displayed to the querying dealer (step not shown in flow chart). While providing the list, supplemental details about the matching items may be provided to the querying dealer. The querying dealer may then study the supplemental details about each available, matching item, and identify the one that best suits his needs (step not shown in FIG. 1)

By way of example, the querying dealer may specify in his order change request that he wants a red Honda Accord with power steering, an AM/FM radio, and an automatic transmission. The processing system may find three orders, previously loaded in the database, describing Accords that match what the querying dealer wants and that the respective waiting dealers want to trade in for the order placed by the querying dealer. The first order may also include, in addition to all the features specified by the querying dealer, a moon roof, for example, while the second order may include a navigation system, and the third order may include a rack. After reviewing all three orders, the querying dealer may select the one that best suits his needs.

Alternatively, none of the available matching items in the list may satisfy the querying dealer. For example, the querying dealer may find that these extra features (the moon roof, the navigation system, and the rack) drive up the price of the Accord to a level that would not be acceptable to his customer. In this case, the querying dealer may communicate to the processing system that none of the items on the list satisfy his needs, and may refuse to agree to the switch.

The processing system may then allow the querying dealer to submit a revised order, and repeat step 130 above for the revised order. In the revised order, the querying dealer may provide a revised description of the item he wants in exchange for the item he originally ordered, after consulting with his customer. For example, the querying dealer might ask this time for a red Honda Accord with power steering, an AM/FM radio, but with any type of transmission (either manual or automatic). The querying dealer might also specifically request an Accord in which no moon roof, navigation system, and rack is included. The processing system may then search the database, to see whether any items can be found that match the description in the revised order submitted by the querying dealer.

Once a match is found, and confirmation received from the querying dealer that he agrees to the swap, the processing system may notify the other dealer (i.e. the waiting dealer whose order was matched with the querying dealer's order) about the swap, in step 150. The processing system may then proceed to direct the manufacturer to swap the recipients of the matching orders, in step 160.

Alternatively, before proceeding to step 160, the processing system may provide the querying dealer's order to the waiting dealer whose order was matched with the querying dealer's order (step not illustrated in FIG. 1). The processing system may then seek confirmation from the waiting dealer that the waiting dealer agrees to a switch of the recipients of the matching orders. Upon receiving confirmation of approval of the swap from the waiting dealer, the processing system may proceed to direct the manufacturer to swap the recipients of the matched orders, in step 160.

In this way, each dealer may end up getting the item that he wants, without requiring any alteration in the manufacturing process for the item. Only a change in the manufacturer's paperwork may be, needed.

Figure 2:
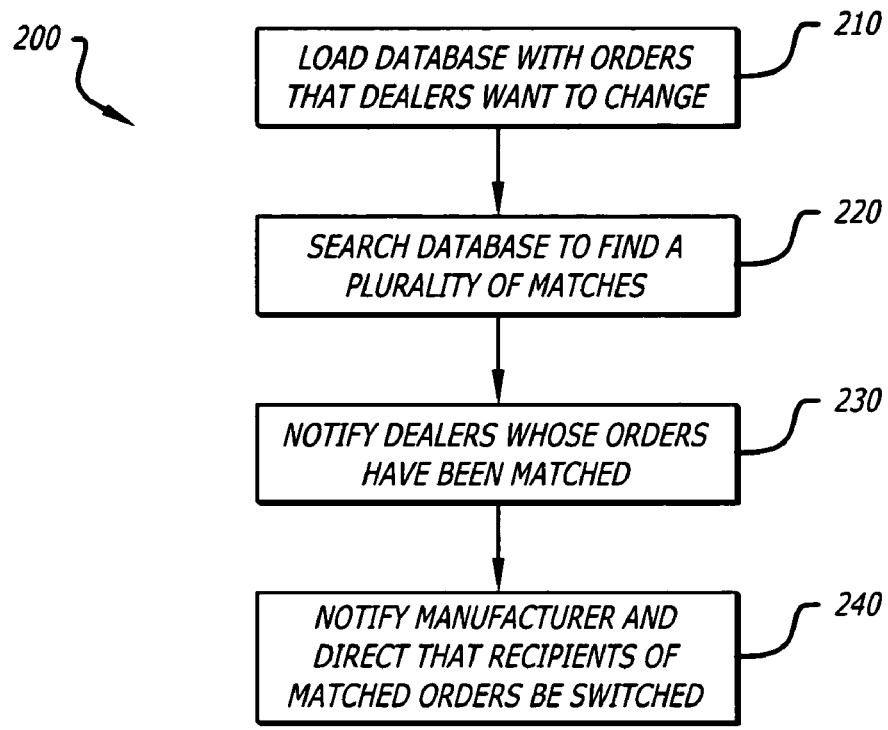
FIG. 2 is a flow chart that schematically illustrates an embodiment of a process for modifying a plurality of orders that does not require a change in the manufacturing processes associated with those orders.

FIG. 2 is a flow chart that schematically illustrates an embodiment of a process 200 for modifying a plurality of orders that does not require a change in the manufacturing processes associated with those orders. In overview, in step 210 a plurality of orders that dealers want to change may be loaded in a database. Each dealer who wants to change his order may post to the database an order change request, in which the dealer describes the item that he has ordered, and the item that he wants instead. The order change request, containing a description of the desired replacement features, may be loaded in the database. In step 220, a processing system connected to the database may search the database in order to find a plurality of matches in the database between orders that the dealers want to modify. In step 240, the processing system may direct that the recipients of matched orders, if any, be switched.

In the process 200 illustrated in FIG. 2, a querying dealer may not be notified instantly (i.e. in real time) of a match. Rather, the querying dealer may post his order change request, after which the processing system may perform the search and analyze the database at certain predetermined points in time, in order to find matches between the posted orders. By way of example, the processing system may access the database at a certain time every night, or at any other suitable times, in order to analyze the orders posted to the database in the meantime, and perform searches within the database. During the searches, the processing system may attempt to make as many matches as possible.

The process 200 illustrated in FIG. 2 may differ from the process 100 illustrated in FIG. 1 in several respects. For example, the processing system may make swaps based on information that arrives in the database a certain period of time after the querying dealer posts his query in the database, rather than making swaps based on information currently present in the database at the time of the query by the querying dealer, as in the embodiment illustrated in FIG. 1.

As another example, the process 200 illustrated in FIG. 2 may effectuate more-that-two-party swaps. For example, the item desired by a first dealer might be taken from a second dealer, while the item desired by the second dealer might be taken from a third dealer, while the item desired by the third dealer might be taken from the first dealer. In other words, the processing system may: 1) find a match between a first order submitted by a first dealer, and a second order submitted by a second dealer different from the first dealer; 2) find another match between the second order and a third order submitted by a third dealer different from both the first and second dealers; and 3) find yet another match between the third order and the first order. Of course, in other cases matches may be found between orders posted by more than three different dealers.

Various algorithms may be employed (step not shown in FIG. 2) by the processing system to maximize the number of successful swaps. For example, an algorithm may be used that causes different combinations of swaps to be made. The algorithm may compare these different combinations, and analyze them for effectiveness. The algorithm may select, from these different combinations, an optimal combination.

After finding an optimal combination of matches, the processing system may notify, in step 230, the dealers who submitted the matching orders of the swaps. Alternatively, the processing system may provide a matching order to each dealer for whom a match was found in the database. The matching order may include a description of the matching item, which the dealer receiving the matching order may examine. The processing system may seek, from each dealer to whom a matching order was provided, verification that the dealer agrees to a switch of the recipients of the matched orders.

Once the dealers have been notified, and/or once the dealers have been provided with the matching orders and have agreed to the swaps, the processing system may notify the manufacturer of the swap in step 240, directing the manufacturer to switch the recipients of the matched orders.

Figure 3:
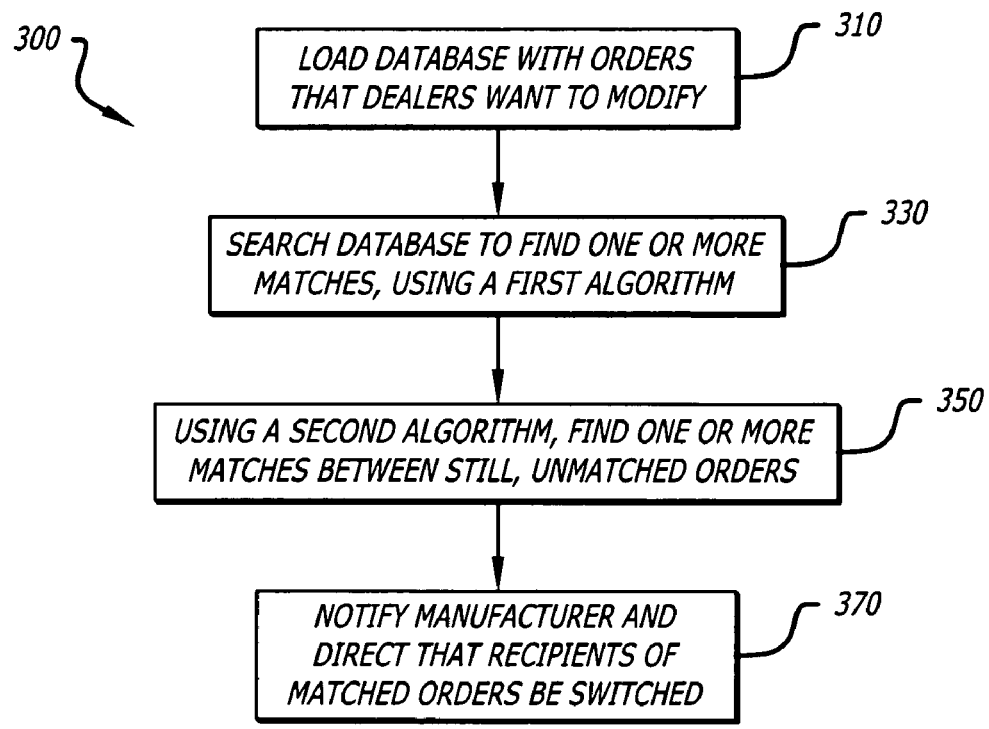
FIG. 3 is a flow chart that schematically illustrates one embodiment of a process for modifying a plurality of orders while minimizing changes in the manufacturing processes that are associated with those orders.

FIG. 3 is a flow chart that schematically illustrates an embodiment of a process 300 for modifying a plurality of orders while minimizing changes in the manufacturing processes that are associated with those orders. In overview, in step 310 a database may be loaded with orders that dealers want to modify. In step 330, a processing system connected to the database may search the database for one or more matches between the orders loaded in the database, using a first algorithm. In step 350, following use of the first algorithm, the processing system may find one or more matches in the database between still, unmatched orders that the dealers want to modify, using a second algorithm that is different from the first algorithm. In step 370, the processing system may direct the manufacturer to switch the recipients of the matched orders.

In the embodiment illustrated in FIG. 3, a querying dealer may query the database for an instant swap in step 330, by analogy to the process 100 described in conjunction with FIG. 3. In response to the query made by the querying dealer, the processing system may use a first algorithm to search the database in order to find a match for the querying dealer in the database.

If an acceptable swap is not found by the processing system using the first algorithm, the querying dealer may post the information about the swap that he needs, i.e. about the desired replacement features for the order he had originally made.

The processing system may then use a second algorithm, different from the first algorithm, to find one or more matches in the database between still, unmatched orders that the dealers want to modify.

At this point, the querying dealer may enter supplemental details about the item he wants (in addition to the desired replacement features he had posted previously). This may be because, unlike during implementation of process 100, the querying dealer may not be given a chance to approve the match that is made.

The processing system may later search and analyze the database, using the second algorithm, to match up as many of the still-unsatisfied order change requests as it can, by analogy to process 200 described in conjunction with FIG. 2. As described previously, the processing system may perform such searches and analyses at predetermined points in time, e.g. at a certain time every night, or other suitable times. The second algorithm, used by the processing system during these searches, may allow the supplemental features entered by the querying dealer to be compared to the desired features described in the still-unmatched orders, in order to identify matches.

Figure 4:
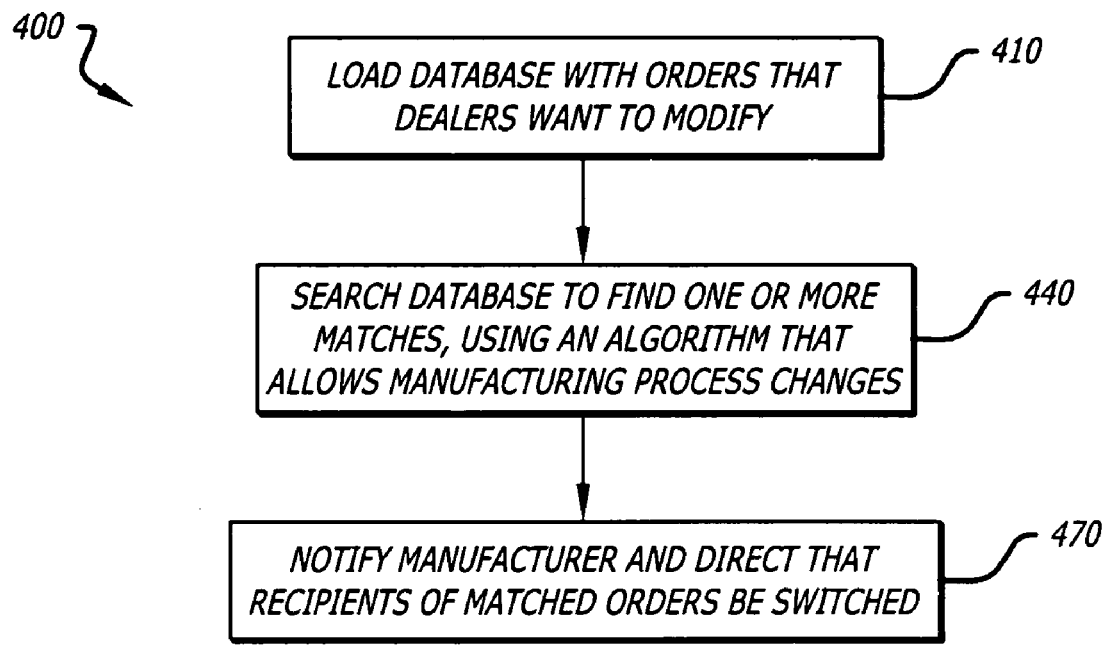
FIG. 4 is a flow chart that schematically illustrates another embodiment of a process for modifying a plurality of orders while minimizing changes in the manufacturing processes that are associated with those orders.

FIG. 4 is a flow chart that schematically illustrates another process 400 for modifying a plurality of orders while minimizing changes in the manufacturing processes that are associated with those orders. In overview, in step 410 a database with orders that dealers want to modify. In step 440, a processing system connected to the database may find one or more matches in the database between the loaded orders, using an algorithm that allows one or more manufacturing process changes to be made as part of the matching process. In step 470, the processing system may direct that the recipients of the matched orders be switched.

Step 440 illustrated in FIG. 4 may be implemented after the database is analyzed by the processing system in accordance with process 200 described in FIG. 2, whether or not the analysis is preceded (as in process 300 in FIG. 3) by instantaneous matches in accordance with process 100 described in FIG. 1. Use of the algorithm in step 440 may represent attempts to make further matches, beyond those made during implementation of process 200 described in FIG. 2.

The processing system may use the algorithm to consult a list of product configuration changes that the manufacturer can easily and inexpensively make. Using an automotive example for illustrative purposes, some vehicle manufacturers may be able to easily change the color of an ordered vehicle at the last moment at no added cost. During step 440, the processing system may analyze once more the desired changes that could not be matched during the database searches made by the processing system. The processing system may then make those further matches that can be made by performing one or more of the easy-to-make production changes that are on the list of allowable production changes. The processing system may then notify the manufacturer about the swaps, and about the easy-to-make production changes that are needed to be made with them.

Alternatively, the processing system may attempt to match the remaining unsatisfied change-order requests, but with an added flexibility of making any production change that is needed to make a match, regardless of costs and difficulty. An effort may nevertheless be made by the processing system to select matches that minimize the amount of needed production changes. Notice of the swaps and the associated needed production changes may then be given to the manufacturer, in step 470, and the manufacturer may be directed to carry out the swaps.

Figure 5:
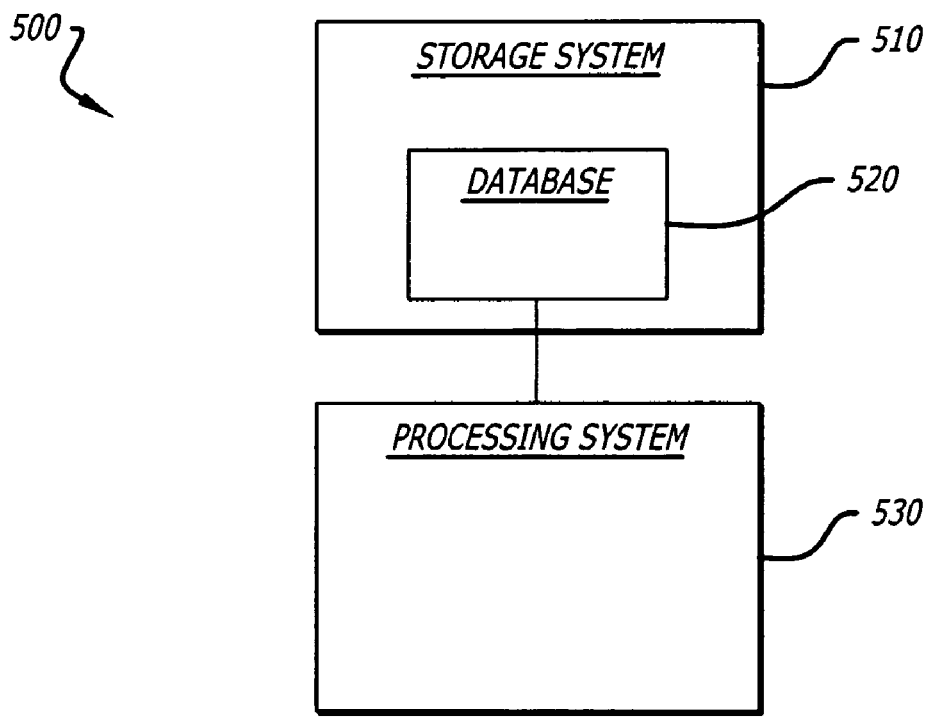
FIG. 5 is an exemplary block diagram illustrating a system for modifying one or more orders with minimal or no changes in the manufacturing processes that are associated with those orders.

FIG. 5 is an exemplary block diagram of one embodiment of a system 500 for modifying one or more orders without requiring changes in the manufacturing processes that are associated with those orders, or while minimizing such changes. In overview, the system 500 includes a storage system 510 having a database 520; and a processing system 530 connected to the database 520.

The processing system 530 may be configured to load the database 520 with orders that dealers want to modify. The processing system 530 may be configured to load with each order an order change request, in which the dealer submitting the request describes the item that he has ordered, and the item that he wants instead. The processing system 530 may be further configured to search the database 520 in order to find one or more matches in the database between orders that the dealers want to modify. The processing system 530 may be further configured to direct that the recipients of matched orders, if any, be switched.

The processing system 530 may be operable in an interactive mode, and/or a batch mode, and/or any combination of the two modes. When operating in an interactive mode, the processing system 530 may be configured to proceed in accordance with the process 100 described in conjunction with FIG. 1. The processing system 530 may be configured to load into the database 520 orders that waiting dealers want to modify. The processing system 530 may be configured to receive, from a querying dealer, an order that the querying dealer wants to modify. The processing system 530 may be configured to access the database 520 in response to the query, and to perform searches to see whether any previously loaded orders from waiting dealers match the querying dealer's order.

The processing system 530 may be configured to provide a matching order to the querying dealer, if a match is found, and to seek the querying dealer's approval for the match. The processing system 530 may be configured to give the querying dealer a chance to revise the change request, and/or to submit a new order altogether, if no match is found. The processing system 530 may be configured to provide a list of all available items to the querying dealer, if a plurality of matches are found, and to ask the querying dealer to select from the list the order that best matches his needs. The processing system 530 may be configured to notify the waiting dealer whose order was matched with the querying dealer's order, once the querying dealer has selected an optimal matching order, and has given his approval about the swap. The processing system 530 may be configured to notify the manufacturer about the swap, and to direct the manufacturer to switch the recipients of the matched orders.

When operated in the batch mode, the processing system 530 may be configured to proceed in accordance with the process 200 described in conjunction with FIG. 2. Rather than being configured to notify a querying dealer instantly of a match, the processing system may be configured to allow the querying dealer to post his order change request. The processing system 530 may be configured to perform one or more searches of the database 520 subsequent to the query posted by the querying dealer. The processing system 530 may be configured to perform searches and analyses of the database 520 at certain predetermined points in time (e.g. at a certain time every night), in order to find matches between the posted orders. The processing system 530 may be configured to attempt to make as many matches as possible between the orders posted in the database.

The processing system 530 may be configured to make swaps based on information that arrives in the database a certain period of time after the querying dealer has posted his query. The processing system 530 may be configured to effectuate more-that-two-party swaps. The processing system 530 may be configured to employ various algorithms in order to maximize the number of successful swaps. The processing system 530 may be configured to notify, after an optimal combination of matches is found, the dealers who submitted the matching orders, and to seek the dealers' approval for the swaps.

The processing system 530 may be operated in the interactive mode and the batch mode in sequence, in any combinations of sequences of the two modes, or solely in one or the other of the modes. For example, the processing system 530 may be configured to use a first algorithm to search the database 520 for one or more matches between the orders that the dealers want to modify. The processing system 530 may be configured to use a second algorithm, following the use of the first algorithm, to find one or more matches in the database between still, unmatched orders.

The processing system 530 may be configured to use an algorithm that allows one or more manufacturing process changes to be made as part of the matching process. Such an algorithm may be used to attempt to make further matches, beyond the matches as described above. The processing system 530 may be configured to use the algorithm to consult a list of product configuration changes that the manufacturer can easily and inexpensively make. Alternatively, the processing system 530 may be configured to attempt to match unsatisfied change-order requests that remain after the interactive and batch mode operations described above, but with the added flexibility of making any production change that is needed to make a match, regardless of costs and difficulty. The processing system 530 may be configured to attempt to select matches that minimize the amount of needed production changes.

The processing system 530 may be configured give notice of the swaps and the associated needed manufacturing changes (which may or may not be chosen from a list) to the manufacturer and the dealers.

The methods and systems described above may reduce production lead-time, by allowing order changes up to a point in time extremely close to the production of the ordered items. Dealers may be able to change orders from manufacturers closer to market to better meet the demands of individual customers, thereby avoiding or minimizing expensive production changes to manufacture. The manufacturer may be able to improve order change fulfillment by swapping sales orders before products are produced.

Furthermore, the method and system described above may enable dealers to trade orders in a number of ways, including but not limited to the following: without a relationship with another dealer, across model lines, within import port of entry, across all North American sources, across targeted production weeks, and very shortly before commercial production and/or vessel arrival at an import port of entry. The order-swaps may be made as close as about three days before the commercial production and/or arrival of the products in a vessel at an import port of entry.

Using the method and system described above, the dealers may be better equipped to obtain for their customers the desired item, at the desired place, at the desired time, to optimally meet market needs.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. The storage medium may be coupled to the processor such that the processor can read information from, and write information to, the storage medium. In the alternative, the storage medium may be integral to the processor.

While certain embodiments of a method and system for modifying orders have been described, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for modifying a purchase order for a manufactured product without requiring a change in the processes associated with the manufacture of that product, the system comprising:
 a storage system containing a database;
 a processor configured to:
  load the database with a plurality of purchase orders and change requests from waiting dealers, each purchase order specifying at least one manufactured product configuration for delivery to a first recipient, and each change request specifying a desired modification to a manufactured product configuration in a purchase order;

receive a change request from a querying dealer, the change request specifying a desired modification to a manufactured product configuration in a purchase order for delivery to a second recipient different from the first recipient from the querying dealer;

find a matching purchase order in the database that specifies the manufactured product configuration specified in the change request from the querying dealer and that is from a waiting dealer that made a change request for the manufactured product configuration that is specified in the purchase order from the querying dealer;

switch the first recipient designated in the matching purchase order from the waiting dealer to the second recipient designated in the purchase order from the querying dealer; and switch the second recipient designated in the purchase order from the querying dealer to the first recipient designated in the matching purchase order from the waiting dealer, whereby the processes associated with the manufacture of the product configurations that are specified in the purchase order from the querying dealer and the matching purchase order are not modified.

2. The system of claim 1, wherein the processor is further configured to transmit to the querying dealer the order that the one of the waiting dealers wants to modify and that is matched with the order that the querying dealer wants to modify, and to request confirmation from the querying dealer that the querying dealer agrees to a switch of the recipients of the matched orders.

3. The system of claim 1, wherein the processor is further configured to transmit to the one of the waiting dealers the order that the querying dealer wants to modify and that is matched with the order that the one of the waiting dealers wants to modify, and to request a confirmation that the one of the waiting dealers agrees to a switch of the recipients of the matched orders.

4. The system of claim 1, wherein the processor is further configured to direct the querying dealer to submit a revised order, if a match between the order that the querying dealer wants to modify and an order that one of the waiting dealers wants to modify is not found in the database, and wherein the processor is further configured to search the database for a match between the revised order and an order that one of the waiting dealers wants to modify.

5. The system of claim 1,
wherein the database is further configured to store, for each one the orders that waiting dealers want to modify, a description of the originally ordered item and of a desired replacement item; and wherein the processor is further configured to receive a description of the item ordered by the querying dealer, and a of modified item that the querying dealer wants as a replacement for the ordered item; and wherein the processor is further configured to search the database to identify, from the orders loaded in the database, an order having originally ordered item that most closely matches the modified item wanted by the querying dealer, and having a desired replacement item that most closely matches the item that was ordered by the querying dealer.

6. The system of claim 5, wherein the processor is further configured to:
find matches between the order that the querying dealer wants to modify and a plurality of orders that the waiting dealers want to modify;
provide the plurality of orders to the querying dealer; and
direct the querying dealer to select from the plurality of orders an order that best matches the needs of the querying dealer.

7. The system of claim 6, wherein the processor is further configured to receive one or more supplemental details regarding at least some of the plurality of orders, the supplemental details not included in the description of the desired replacement item stored in the database, and to provide the supplemental details to the querying dealer for use in selecting the order that best matches the needs of the querying dealer.

8. A system for modifying a plurality of purchase orders for manufactured products without requiring a change in the processes associated with the manufacture of those products, comprising:
a storage system including a database;
a processor configured to:
load the database with a plurality of purchase orders and change requests from dealers, each purchase order specifying at least one manufactured product configuration for delivery to a recipient, and each change request specifying a desired modification to a no-longer wanted manufactured product configuration in a purchase order;
find a plurality of matching purchase orders in the database, each matching purchase order specifying a no-longer wanted manufactured product configuration that was specified in a matching change request and being from a dealer that made a change request for a manufactured product configuration that is specified in one of the other matching purchase orders, wherein the recipients specified in each of the matching purchase orders are different from each other; and
switch the recipient specified in each matching purchase order to the recipient specified in the purchase order from the dealer of the matching change request,
whereby the processes associated with the manufacture of the product configurations that are specified in the matching purchase orders are not modified.

9. The system of claim 8, wherein the processor is further configured to:
find a match between a first order submitted by a first dealer, and a second order submitted by a second dealer different from the first dealer;
find another match between the second order and a third order submitted by a third dealer different from both the first and second dealers; and
find another match between the third order and the first order.

10. The system of claim 8, further comprising:
wherein the processor is further configured to receive, for each of the orders stored in the database, a modification request from the respective dealer, and to load the database with the received modification requests, each modification request including a description of one or more desired replacement features for the item being ordered.

11. The system of claim 10, wherein the processor is further configured to find at least one match between an order for which a modification request has been received, and another order that was loaded in the database after the modification request was received.

12. The system of claim 8, wherein the processor is further configured to use an algorithm to maximize the number of matched orders whose recipients can be switched.

13. The system of claim 12 wherein the processor is further configured to use the algorithm to compare different combinations of matched orders, and to select from the different combinations an optimal combination of matched orders 14. A system for modifying a plurality of purchase orders for manufactured products while minimizing changes in the processes that are associated with the manufacture of those orders comprising:
   a storage system including a database;
   a processor configured to:
      load the database with a plurality of purchase orders and change requests from waiting dealers, each purchase order specifying at least one manufactured product configuration for delivery to a recipient, and each change request specifying a desired modification to a no-longer wanted manufactured product configuration in a purchase order;
      search the database for one or more matches between the purchase orders for no-longer wanted product that the dealers want to modify, using a first algorithm;
      search the database, following use of the first algorithm, to find one or more matches in the database between still, unmatched purchase orders for no-longer wanted product configurations that the dealers want to modify, using a second algorithm that is different from the first algorithm, and
      direct the recipients of the matched orders to be switched, which recipients are different,
   whereby the processes associated with the manufacture of the product configurations that are specified in the matched purchase orders are not modified.

15. A system for modifying a plurality of purchase orders for manufactured products while minimizing changes in the processes that are associated with the manufacturer of those products comprising:
   a storage system including a database;
   a processor configured to
      load the database with a plurality of purchase orders and change requests from dealers, each purchase order specifying at least one manufactured product configuration for delivery to a recipient, and each change request specifying a desired modification to a no-longer wanted manufactured product configuration in a purchase order;
      search the database in order to find one or more matches in the database between the no-longer wanted purchase orders that the dealers want to modify, using an algorithm that allows one or more manufacturing process changes to be made as part of the matching process; and
      direct that the recipients of the matched orders be switched, which recipients are different.

16. The system of claim 15, wherein the processor is further configured to select the one or more manufacturing process changes from a list of allowable manufacturing process changes.

17. The system of claim 16, wherein the processor is further configured to notify a manufacturer of the items ordered by the dealers about the one or more manufacturing process changes to be made as part of the matching process.

18. A non-transitory computer-readable storage medium having stored therein computer-readable instructions for a processor, wherein the instructions, when read and implemented by the processor, cause the processor to:
   load a database with a plurality of purchase orders and change requests from waiting dealers, each purchase order specifying at least one manufactured product configuration for delivery to a first recipient, and each change request specifying a desired modification to a manufactured product configuration in a purchase order;
   receive a change request from a querying dealer, the change request specifying a desired modification to a manufactured product configuration in a purchase order for delivery to a second recipient different from the first recipient from the querying dealer;
   find a matching purchase order in the database that specifies the manufactured product configuration specified in the change request from the querying dealer and that is from a waiting dealer that made a change request for the manufactured product configuration that is specified in the purchase order from the querying dealer; and
   switch the first recipient designated in the matching purchase order from the waiting dealer to the second recipient designated in the purchase order from the querying dealer; and
   switch the second recipient designated in the purchase order from the querying dealer to the first recipient designated in the matching purchase order from the waiting dealer,
   whereby the processes associated with the manufacture of the product configurations that are specified in the purchase order from the querying dealer and the matching purchase order are not modified.

19. The non-transitory computer-readable storage medium of claim 18 wherein the computer-readable instructions, when read and implemented by the processor, cause the processor to be receiving at least one of:
   a confirmation by the querying dealer that the querying dealer agrees to a switch of the recipients of the matched orders; and
   a confirmation that the one of the waiting dealers agrees to a switch of the recipients of the matched orders.

20. The non-transitory computer-readable storage medium of claim 18 wherein the computer-readable instructions, when read and implemented by the processor, cause the processor to be:
   providing, to the querying dealer, the order that the one of the waiting dealers wants to modify and that is matched with the order that the querying dealer wants to modify; and
   verifying that the querying dealer agrees to a switch of the recipients of the matched orders.

21. The non-transitory computer-readable storage medium of claim 18 wherein the computer-readable instructions, when read and implemented by the processor, cause the processor to be:
   providing, to the one of the waiting dealers, the order that the querying dealer wants to modify and that is matched with the order that the one of the waiting dealers wants to modify; and
   verifying that the one of the waiting dealers agrees to a switch of the recipients of the matched orders.

22. The non-transitory computer-readable storage medium of claim 18 wherein the computer-readable instructions, when read and implemented by the processor, cause the processor to be storing in the database, for each one the orders that waiting dealers want to modify, a description of the originally ordered item and a desired replacement item; and receiving from the querying dealer a description of the item ordered by the querying dealer and a modified item that the querying dealer wants as a replacement for the ordered item; and wherein finding the match in the database comprises searching the database to identify, from the orders loaded in the database, an order having an originally ordered item that most closely matches the modified item wanted by the querying dealer, and having a desired replacement item most closely matches the item that was ordered by the querying dealer.

23. The non-transitory computer-readable storage medium of claim 22, wherein finding the match in the database comprises finding matches between the order that the querying dealer wants to modify and a plurality of the orders that the waiting dealers want to modify; and wherein the computer-readable instructions, when read and implemented by the processor, cause the processor to be providing the plurality of orders to the querying dealer, to allow the querying dealer to select from the plurality of orders an order that best matches the needs of the querying dealer.

24. The non-transitory computer-readable storage medium of claim 23 wherein the computer-readable instructions, when read and implemented by the processor, cause the processor to be:

receiving a communication from the querying dealer indicating that none of the plurality of orders matches the needs of the querying dealer;

receiving from the querying dealer a new order that the querying dealer wants to modify; and finding a match in the database between the new order from the querying dealer and one or more orders that the waiting dealers want to modify.

25. The non-transitory computer-readable storage medium of claim 23 wherein providing the plurality of orders to the querying dealer comprises receiving, for at least some of the plurality of orders, one or more supplemental details of the desired replacement items, the supplemental details not included in the description stored in the database, and providing the supplemental details to the querying dealer for use in selecting the order that best matches the needs of the querying dealer.

26. The non-transitory computer-readable storage medium of claim 22 wherein the computer-readable instructions, when read and implemented by the processor, cause the processor to be:

receiving a communication from the querying dealer indicating that the querying dealer does not agree to the switch of the recipients of the matched orders;

receiving a revised order from the querying dealer, the revised order comprising at least one of: a new order that the querying dealer wants to modify, and a revised description of the modified item that the querying dealer wanted as a replacement for the original item ordered by the querying dealer; and finding a match in the database between the revised order from the querying dealer and an order that one of the waiting dealers wants to modify.

27. The non-transitory computer-readable storage medium of claim 18 wherein the acts of receiving an order that a querying dealer wants to modify, finding a match in the database between the order that the querying dealer wants to modify and an order that one of the waiting dealers wants to modify, and directing that the recipients of the matched orders be switched are performed prior to a point in time that precedes, by a predetermined time interval, at least one of:

a commercial production of the items originally ordered by the waiting dealers and by the querying dealer; and an arrival of said originally ordered items at an import port of entry.

28. The non-transitory computer-readable storage medium of claim 27 wherein the predetermined time interval is at least three days.

29. A non-transitory computer-readable storage medium having stored therein computer-readable instructions for a processor, wherein the instructions, when read and implemented by the processor, cause the processor to:

load a database with a plurality of purchase orders and change requests from dealers, each purchase order specifying at least one manufactured product configuration for delivery to a recipient, and each change request specifying a desired modification to a no-longer wanted manufactured product configuration in a purchase order;

find a plurality of matching purchase orders in the database, each matching purchase order specifying a no-longer wanted manufactured product configuration that was specified in a matching change request and being from a dealer that made a change request for a no-longer wanted manufactured product configuration that is specified in one of the other matching purchase orders, wherein the recipients specified in each of the matching purchase orders are different from each other; and switching the recipient specified in each matching purchase order to the recipient specified in the purchase order from the dealer of the matching change request, whereby the processes associated with the manufacture of the product configurations that are specified in the matching purchase orders are not modified.

30. The non-transitory computer-readable storage medium of claim 29 wherein finding the plurality of matches in the database comprises:

finding a match between a first order submitted by a first dealer, and a second order submitted by a second dealer different from the first dealer;

finding another match between the second order and a third order submitted by a third dealer different from both the first and second dealers; and finding another match between the third order and the first order.

31. The non-transitory computer-readable storage medium of claim 29 wherein the computer-readable instructions, when read and implemented by the processor, cause the processor to be:

providing, to each one of the dealers for whom a matching order was found in the database, the matching order;

verifying that each dealer to whom the matching order was provided agrees to a switch of the recipients of the matched orders, after examining the matching order.

32. The non-transitory computer-readable storage medium of claim 29 wherein the computer-readable instructions, when read and implemented by the processor, cause the processor to be receiving, for each of the orders that dealers want to modify, a modification request from the respective dealer, and loading the database with the received modification requests; and wherein each modification request includes a description of one or more desired replacement features for the item being ordered.

33. The non-transitory computer-readable storage medium of claim 32 wherein finding the plurality of matches in the database comprises:

finding at least one match between an order for which a modification request has been received, and another order that was loaded in the database after the modification request was received.

34. The non-transitory computer-readable storage medium of claim 29 wherein finding the plurality of matches in the database comprises using an algorithm to maximize the number of matched orders whose recipients can be switched.

35. The non-transitory computer-readable storage medium of claim 34 wherein the algorithm is adapted to compare different combinations of matched orders, to select an optimal combination of matched orders from the different combinations of matched orders.

36. A non-transitory computer-readable storage medium having stored therein computer-readable instructions for a processor, wherein the instructions, when read and implemented by the processor, cause the processor to:
  load a database with a plurality of purchase orders and change requests from waiting dealers, each purchase order specifying at least one manufactured product configuration for delivery to a recipient, and each change request specifying a desired modification to a no-longer wanted manufactured product configuration in a purchase order;
  search the database for one or more matches between the no-longer wanted manufactured product orders that the dealers want to modify, using a first algorithm;
  following use of the first algorithm, find one or more matches in the database between still, unmatched, no-longer wanted manufactured product orders that the dealers want to modify, using a second algorithm that is different from the first algorithm; and
  direct that the recipients of the matched orders be switched, which recipients are different,
  whereby the processes associated with the manufacture of the product configurations that are specified in the matched purchase orders are not modified.

37. The non-transitory computer-readable storage medium of claim 36 wherein loading the database with orders that dealers want to modify comprises storing in the database one of more desired replacement features for each item being ordered.

38. The non-transitory computer-readable storage medium of claim 37 wherein the computer-readable instructions, when read and implemented by the processor, cause the processor to be loading the database with supplemental features that are desired, in addition to the desired replacement features, for at least some of the orders that the dealers want to modify, following use of the first algorithm.

39. The non-transitory computer-readable storage medium of claim 38 wherein the second algorithm allows the supplemental features to be compared with the desired replacement features for at least some of the still, unmatched orders.

40. The non-transitory computer-readable storage medium of claim 37 wherein the computer-readable instructions, when read and implemented by the processor, cause the processor to be notifying a manufacturer of the items ordered by the dealers about the one or more manufacturing process changes to be made as part of the matching process.

41. The non-transitory computer-readable storage medium of claim 36 wherein the second algorithm allows one or more manufacturing process changes to be made as part of the matching process.

42. A non-transitory computer-readable storage medium having stored therein computer-readable instructions for a processor, wherein the instructions, when read and implemented by the processor, cause the processor to:
  load a database with a plurality of purchase orders and change requests from dealers, each purchase order specifying at least one manufactured product configuration for delivery to a recipient, and each change request specifying a desired modification to a no-longer wanted manufactured product configuration in a purchase order;
  find one or more matches in the database between the no-longer wanted orders that the dealers want to modify using an algorithm that allows one or more manufacturing process changes to be made as part of the matching process; and
  direct that the recipients of the matched orders be switched, which recipients are different.

43. The non-transitory computer-readable storage medium of claim 42 wherein the computer-readable instructions, when read and implemented by the processor, cause the processor to be selecting the one or more manufacturing process changes from a list of allowable manufacturing process changes.

* * * * *